United States Patent Office 2,890,165
Patented June 9, 1959

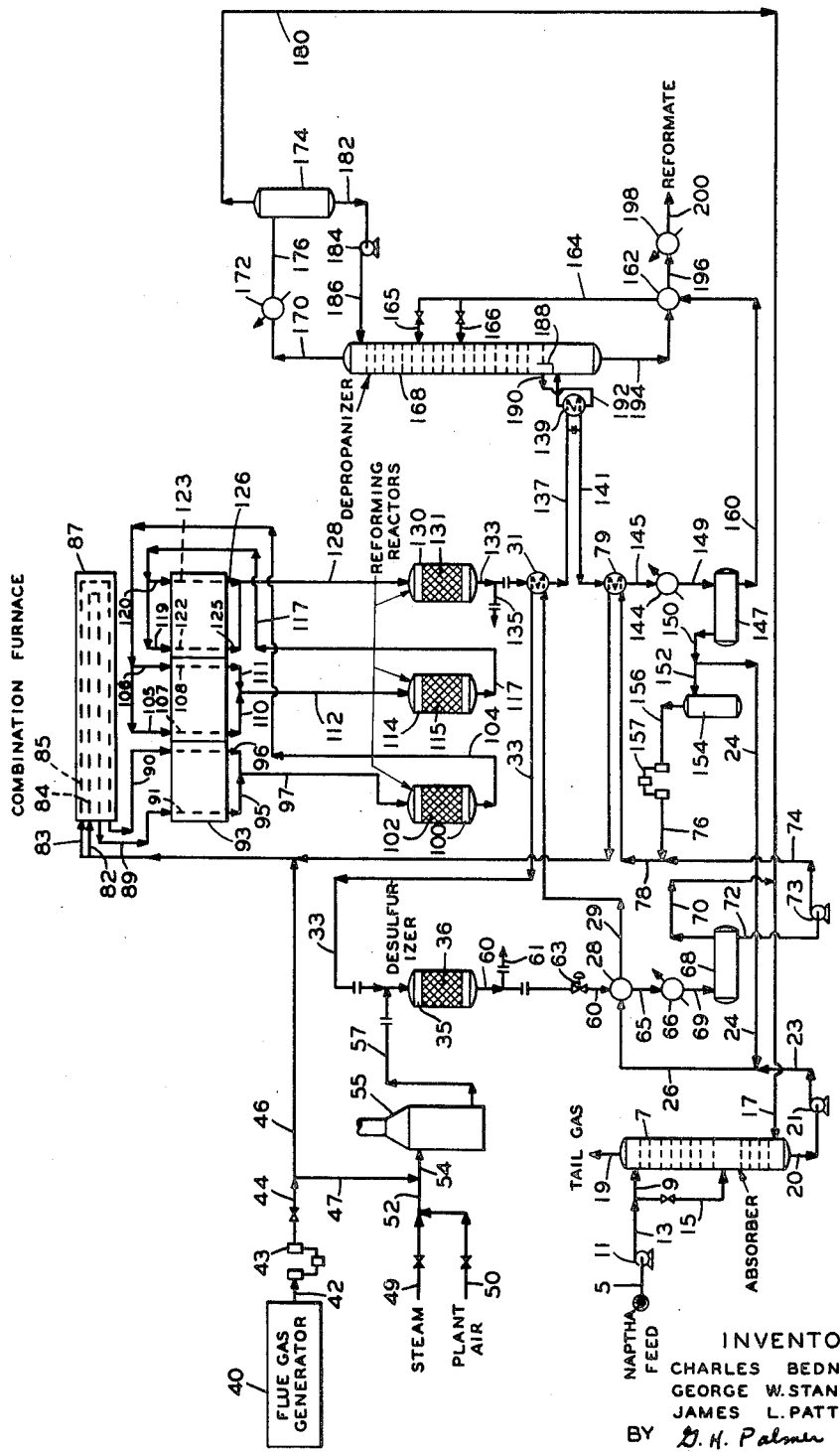

2,890,165

HYDROCARBON DESULFURIZATION PROCESS

Charles Bednars, Port Washington, N.Y., and George W. Stanford, Linden, and James L. Patton, Ramsey, N.J., assignors to The M. W. Kellogg Company, Jersey City, N.J., a corporation of Delaware Application November 18, 1953, Serial No. 392,827

15 Claims. (Cl. 208—89)

The present invention relates to an improved method for desulfurizing hydrocarbon oils, and more particularly, this invention is concerned with a process for desulfurizing light hydrocarbon oils to be used as feed stocks in a hydroforming process.

The catalytic reforming of light hydrocarbon oils for the production of high octane gasolines is effected more economically and efficiently with low sulfur containing feed stocks. Sulfur has an adverse effect upon product distribution, hence, under some conditions it is advisable to pretreat the feed stock for sulfur removal. This problem is particularly acute in the case of a hydroforming process using a platinum catalyst, because for reasons not too clearly understood, platinum is more seriously affected by sulfur than other conventional hydroforming catalysts.

In the desulfurization processes known heretofore, various techniques are used for the removal of sulfur. An effective method for this purpose is to employ a hydrogenation catalyst and pass a mixture of the feed and hydrogen thereover, thus converting a substantial portion of the sulfur compounds to hydrogen sulfide. The unused hydrogen is recycled to the reaction zone along with make-up hydrogen, and the conditions of separating normally gaseous product from liquid material were selected to include a large amount of hydrogen sulfide in the liquid product, which could be later scrubbed with caustic for the removal thereof. In any event, the procedure used for the removal of hydrogen sulfide is more complicated and involves more expense than is desired for this rather simple process.

An object of this invention is to provide an improved process for the desulfurization of hydrocarbon oils.

Another object of this invention is to provide a combination process wherein the feed material for a hydroforming treatment is first desulfurized and then reformed, under overall conditions leading to efficiency and economy.

Other objects and advantages of this invention will become apparent from the following description and exploration thereof.

In accordance with this invention, a hydrocarbon oil containing sulfur is contacted with a hydrogenation catalyst in the presence of hydrogen at an elevated temperature and pressure such that a reaction product containing hydrogen sulfide is produced, cooling the reaction product, reducing the pressure of the reaction product thus forming (1) a normally gaseous product containing a substantial amount of the hydrogen sulfide and including a portion of the normally liquid product material and (2) a normally liquid product of substantially reduced sulfur concentration, contacting the liquid feed material prior to desulfurization with the normally gaseous material in an absorption zone whereby a substantial amount of the normally liquid components are removed from the gaseous material.

In a desulfurization process where the sulfur compounds are hydrogenated to hydrogen sulfide, the hydrogen sulfide can be present in both the gaseous material and the liquid product. In one mode of operation, the separation of gaseous product from the total product is effected to produce a liquid material containing the majority of the hydrogen sulfide dissolved therein, and it is necessary to remove this hydrogen sulfide by caustic treatment, etc. By this method, the gaseous product material contains little or a minor amount of hydrogen sulfide and a small amount of normally liquid compounds, e.g., $C_4$ and $C_5$ hydrocarbons. The normally gaseous product contains unused hydrogen and so this stream is recycled to the desulfurization zone for further utilization of hydrogen contained therein. In the present invention, the separation of liquid material from the normally gaseous material is effected under conditions resulting in the majority of or a predominant quantity of hydrogen sulfide in the normally gaseous product. By this technique, the normally liquid product may not require treatment for removal of hydrogen sulfide, because the quantity of dissolved hydrogen sulfide is within the permissible range. For example, a hydrocarbon feed to be desulfurized from a sulfur content of not more than 0.12% sulfur, by weight, to 0.03% by weight, or 75% removal of sulfur, can be effected without caustic treatment of the liquid product. However, by controlling conditions of temperature and pressure of the total reaction product, the liquid product can be separated therefrom with a minimum of dissolved hydrogen sulfide, but the gaseous product material contains an undesired amount of normally liquid compounds, e.g., $C_4$ and/or $C_5$ hydrocarbons. These can be recovered by an absorption treatment using the liquid feed material as the absorbing medium under controlled conditions, such that an undesired quantity of hydrogen sulfide is not absorbed thereby.

In another aspect of this invention, it is contemplated employing the desulfurized liquid product in a reforming unit, which is operated under conditions resulting in a net consumption or production of hydrogen. The normally gaseous material from the reforming operation usually contains recoverable normally liquid hydrocarbons e.g., $C_4$ and/or $C_5$ hydrocarbons, hence this product stream can be passed to the absorption zone wherein the liquid feed material to the desulfurization unit is employed as the absorption medium. The effect of combining the two streams for processing in the absorption zone is to reduce the percentage of hydrogen sulfide, hence less of it is absorbed in the liquid feed. This invention is especially adapted for the combination of the above described desulfurization operation with a reforming operation in which there is a net production of hydrogen. The hydrogen produced can be used as the sole source of hydrogen supply to the desulfurization reactions, hence, the unused hydrogen from the desulfurization reaction can be discarded. In this manner, the hydrogen sulfide produced in the desulfurization unit can be discarded with the unused hydrogen, and so the separation of normally gaseous materials from the desulfurized normally liquid product is effected under conditions conducive to maximum inclusion of hydrogen sulfide in the normally gaseous material.

The feed material for the desulfurization reaction above can be any hydrocarbon material, for example, reduced crude, gas oil, kerosene, naphtha, gasoline, etc. The feed material may contain about 0.05 to about 6.0% by weight of sulfur, and the present invention has particular applicability to treatment of feed stocks for removal of not more than about 75% of the sulfur content. This kind of operation is especially suitable for light hydrocarbon oils, e.g., kerosene, naphtha and gasoline, which contain not more than about 0.12% by weight of sulfur and at least about 0.05% by weight of the same, and it is necessary to remove not more than about 75% of the sulfur contained therein. These light hydrocarbon oils can be used for various purposes, although a very important use is as feed stocks for reforming operations. The light hydrocarbon oils to be desulfurized for use in a reforming operation have an initial boiling point of about 75° to 350° F. and an end point of about 375° to about 485° F. The materials can be straight run or cracked petroleum stocks or mixtures of the two, accordingly, the olefin content can vary from about 1 to about 30%, and the octane number can be about zero to about 70 CFRR.

The desulfurization reaction is effected with a catalyst having the property of removing sulfur compounds, which are present in the oil feed as mercaptans, thioethers, thiophenes, etc., by conversion to hydrogen sulfide. Such catalysts are hydrogenation catalysts and include, for example, compounds of the left hand elements of group VI, more particularly, the oxides and/or sulfides, of such group VI metals, either alone or in combination with a compound of a group VIII metal having an atomic number not greater than 28, more particularly, the sulfides and/or oxides of such group VIII metals. Nickel or nickel compounds including, for example, the oxides and/or sulfides thereof, can also be used for this purpose. Platinum catalysts containing platinum only or supported on a support material, e.g., alumina, in a fresh or spent form can also be used for this reaction.

Specific examples of catalysts are tungsten sulfide alumina, molybdenum trioxide-alumina, chromia-alumina, cobalt molybdate-alumina, nickel molybdate-alumina, nickel tungstate-alumina, etc. The catalytic element comprises about 0.1 to about 25% by weight of the total catalyst, more usually about 1 to about 12% by weight on the same basis. In catalysts containing two catalytic elements, the group VI compound can be present in the amount indicated above, and the second catalytic element, the group VIII metal compound, can be present in the amount of about 1 to about 15% by weight based on the total catalyst. The support material for the catalytic element can be any known carrier, such as for example, silica, silica-alumina, kieselguhr, pumice, silica-magnesia, magnesia, etc.

The desulfurization reaction is conducted at a temperature of about 600° F. to about 900° F., and a total pressure of about 100 to about 1500 p.s.i.g. The weight space velocity, measured as the pounds of oil feed per hour per pound of catalyst in the reaction zone, is about 0.1 to about 20, more usually in a non-regenerative process about 2.5 to about 15. In the case of a moving bed system, a catalyst to oil ratio, on a weight basis of about 0.01 to about 10 can be used. The hydrogen supplied to the system can vary from about 250 to about 20,000 s.c.f.b., standard cubic feet (measured at 60° F. and 760 mm.) per barrel of oil feed (1 barrel is equal to 42 gallons). The unused hydrogen can be recycled to the desulfurization zone. When the hydrogen for the desulfurization reaction is supplied only by the hydroforming unit as a once through procedure, then the hydrogen is added in the amount of about 500 to about 1800 s.c.f.b. The total pressure varies from about 250 to about 800 p.s.i.g., and the temperature is in the range of about 700° to about 825° F. In this kind of operation, the reaction conditions are selected on the basis of providing a small net consumption of hydrogen, in the order of about zero to about 100 s.c.f.b.

The reforming operation employs the feed stock described above with a reduced sulfur content, e.g., about .001 to about 0.2% by weight, more particularly, in the case of a platinum reforming operation not more than 0.03 or 0.001 to .03% by weight. The feed stock is contacted with a catalyst under reaction conditions to produce or consume hydrogen, depending upon the result desired. Generally, a temperature of about 600° to about 1075° F. is used, and a total pressure of about 25 to about 1000 p.s.i.g. The weight space velocity varies from about 0.05 to about 15. In a moving bed system, a catalyst to oil ratio of about 0.05 to 10, on a weight basis, can be used. The hydrogen added to the system varies from about 750 to about 15,000 s.c.f.b.

The catalyst used in the reforming process has the properties of being able to hydrogenate and dehydrogenate hydrocarbon materials. The kind of materials having these properties are well-known, including catalytic materials described under the desulfurization reaction hereinabove. Another very important class of catalyst for this purpose is the noble metals, e.g., platinum and palladium. The noble metal is present in the catalyst in the amount of about 0.01 to about 5%, more usually, about 0.1 to 2%, based on the total weight of catalyst. Alumina is an excellent support for this catalytic element, although about 1 to 12% by weight of silica stabilizes the alumina at elevated temperatures. Other suitable carrier materials can be used for the noble metals, for example, those disclosed above in connection with the desulfurization catalyst.

As previously indicated, an outstanding feature of this invention resides in using the hydrogen produced in a hydroforming operation as the sole supply for the desulfurization reaction. Since a hydroforming unit employing a platinum catalyst produces a normally gaseous product rich in hydrogen, it is the preferred operation to be used in combination with the desulfurization reaction. The platinum hydroforming operation is conducted at a temperature of about 800° to 950° F., a total pressure of about 100 to 750 p.s.i.g., a weight space velocity of about 0.5 to 7 and a hydrogen rate of about 1000 to about 7500 s.c.f.b. Within these ranges of reaction conditions, the operation can be regenerative or non-regenerative, and the point of demarcation between the two kinds of operation is usually the total pressure. In a non-regenerative process, the process cycle time is at least about 3 months in duration. The hydrogen produced on a net basis can vary from about 150 to 2000 s.c.f.b., however, more usually, the net production of hydrogen is about 500 to about 1800 s.c.f.b.

Having thus provided a description of our invention, reference will now be had to a specific embodiment thereof in the accompanying drawing.

A naphtha fraction having a 51.9° API gravity and containing 0.1% by weight of sulfur is supplied from a source 5 at the rate of 3000 b.p.s.d. 2310 b.p.s.d. of the naphtha are charged to the top of an absorption tower 7 through a line 9, after this naphtha has been pumped by means of pump 11 from line 9 to a line 13. The remaining portion of the naphtha is charged to the lower part of absorption tower 7 by means of a valved line 15. The naphtha enters the absorption tower at a temperature of 90° F., and it serves as an absorption medium for normally liquid hydrocarbons contained in the gaseous material which is fed to the bottom of the tower by means of a line 17. The gaseous material has a molecular weight of 15.0 and it is charged to the tower at a rate of 5,733 pounds per hour. The absorption tower is maintained at a pressure of 85 p.s.i.g. and a temperature of 100° F. The gaseous material flows upwardly in countercurrent contact with the downflowing naphtha. This gaseous material contains hydrogen sulfide, and so, part of the hydrogen sulfide is absorbed by the feed. The quantity absorbed is maintained at a minimum by employing a low pressure for the absorption step, for example, in the range of about 50 to about 150 p.s.i.g. This pressure is also selected on the basis of recovering maximum quantities of normally liquid constituents in the gaseous material. The temperature of the absorption step can also vary from about 50 to 140° F. The quantity of hydrogen sulfide absorbed in the naphtha does not have a significant effect upon the desulfurization reaction, because the total quantity of sulfur in the feed is not great enough to adversely influence sulfur removal or desulfurization catalyst life to an appreciable extent. This absorption step also serves to remove water and/or dissolved oxygen in the feed, which contaminants tend to causing gumming, etc. in heat exchangers. The gaseous material leaves the absorption tower through an overhead line 19 having the composition and at the rate indicated below.

| Composition: | Pounds per hour |
|---|---|
| $H_2$ | 470 |
| Cl | 470 |
| $C_2$ | 940 |
| $H_2S$ | 34 |
| $C_3$ | 2,028 |
| $iC_4$ | 104 |
| $nC_4$ | 46 |

The enriched naphtha is discharged from the bottom of the absorption tower 7 through a line 20 with a changed gravity of 55.8° API and at the rate of 3215 b.p.s.d. This enriched naphtha is transported by means of pump 21 to a line 23 wherein it is admixed with a hydrogen containing gas flowing from a line 24 at the rate of 3,511 pounds per hour. The hydrogen containing gas contains about 72% by volume of hydrogen, and it has a molecular weight of 11.0. The combined stream of hydrogen gas and naphtha passes through a line 26 prior to entering an indirect heat exchanger 28 wherein the temperature is raised from 110° F. to 600° F. The heated stream of reactants, viz. naphtha and hydrogen gas, are discharged from heat exchanger 28, and thence flow into a line 29 prior to entering a second indirect heat exchanger 31. In exchanger 31 the temperature of the reactants is increased from 600° to 780° F. The heated reactants flow from exchanger 31 to a line 33, which in turn is connected to the top of desulfurization reactor 35.

The desulfurization reactor contains a bed of pelleted cobalt molybdate-alumina catalyst shown as Figure 36, which occupies 141 cubic feet of space. The reactor has an internal diameter of 4 feet and a length of 11′ 9″. The total weight of catlyst in the reactor is about 8,430 pounds, hence the weight space velocity is 4.0. The temperature of the reaction is, on the average, about 780° F., and the reaction pressure is about 400 p.s.i.g. The catalyst contains about 9% by weight of molybdenum trioxide and about 3% by weight of cobalt oxide. The reaction is conducted under conditions to provide a non-regenerative operation, namely, it will operate for at least about 3 months without regeneration. The reactants are present in the desulfurization zone as a vapor, however, it is also contemplated using conditions to obtain a liquid or mixed liquid and vapor phase operation.

When it is necessary to regenerate the catalyst, air is used in admixture with steam. For this purpose, steam and air are fed from valved lines 49 and 50, respectively, and these gases are combined as a single stream in line 52. Flue gas is employed for the inert gas purge step. Flue gas is generated in a generator shown schematically as Figure 40, and it passes therefrom through a line 42 prior to being compressed in compressor 43. The compressed flue gas flows from compressor 43 to a line 44, and thence it is divided so that a portion is passed through a line 46 for use in purging the hydroforming reactors to be described later, and the remaining portion passes through a line 47. All the gases flow through a common heater 54 before being heated in a furnace 55. The heated regeneration gas leaves furnace 55 through a line 57, and thence it can enter reactor 35 by first passing through line 33.

The reaction product in a vaporous condition is discharged from reactor 35, and it enters a line 60 connected to the bottom of the reactor. When the reactor is being regenerated, the flue gas is discharged from line 60 to line 61. During the reaction cycle, the reaction product is first depressurized by means of a valve 63 installed in line 60 such that the final pressure is about 110 p.s.i.g. After the depressuring step, the temperature of the product is 785° F., and then it is cooled to about 330° F. by passing through heat exchanger 28. The cooled reaction product passes from exchanger 28 to a line 65, and thence, it passes through a condenser 66. A substantial amount of the normally liquid product material is condensed in the condenser, and the mixture of liquid and gaseous material is passed to an accumulator 68 by means of a line 69. In the accumulator 68, the normally gaseous material is separated from the liquid product at a temperature of about 100° F. and at a pressure of about 95 p.s.i.g. These conditions are conducive to producing a normally gaseous material containing a substantial amount of the hydrogen sulfide product. The temperature and pressure of the separating step can be varied from about 60° to about 140° F. and about 60 to about 150 p.s.i.g. Under these conditions, about 60 to 95% of the total hydrogen sulfide is present in the gaseous material, more usually, about 75 to 85% of same, on a weight basis.

The liquid product contains a small or negligible amount of sulfur compounds in the state as they existed in the hydrogen sulfide product. The total concentration of sulfur in the liquid product is 0.03% by weight, hence, the sulfur removal is 70%, based on the feed material. It is important to control the conditions of temperature and pressure in this separating step such that only a small amount of the hydrogen sulfide remains dissolved in the liquid product. If the conditions are selected to remove the hydrogen sulfide completely from the liquid product, an excessive quantity of normally liquid compounds will become part of the normally gaseous product. Usually, the conditions of this separation are sufficient to produce a normally gaseous product containing about 70 to 85% of the hydrogen sulfide product and the remainder is dissolved in the liquid product. The extent of desulfurization or conversion of sulfur compounds in the liquid feed to hydrogen sulfide is great enough that for all practical purposes the sulfur content of the liquid product is determined by the amount of hydrogen sulfide dissolved therein.

The gaseous material in accumulator 68 is discharged therefrom through an overhead line 70, and since this product contains recoverable normally liquid components, it is passed to line 17 for entry into absorption tower 7. The liquid product contains about 0.03% sulfur, and it should be understood that for purposes of this invention, this represents a safe maximum limit of sulfur concentration for processing in a platinum hydroforming operation. The liquid product is discharged from the bottom of accumulator 68 by means of a line 72, and it is conveyed by means of pump 73 to line 74 wherein it is admixed with a hydrogen containing gas which is fed from a line 76 at the rate of 18,127 pounds per hour and which has a molecular weight of 11.0. The mixture of reactants, viz., desulfurized liquid product and hydrogen gas, existing at a temperature of 120° F. is passed first through a line 78 and then it is passed to a heat exchanger 79 wherein the temperature is raised to 600° F. The reactants leave the exchanger 79 by means of a line 81, and thence the stream is divided so that equal portions pass through lines 82 and 83, prior to entering furnace tubes 84 and 85, respectively, of convection section 87 of the furnace, shown schematically. The reactants in a vaporous or gaseous condition are discharged from tubes 84 and 85 of the convection section, and thence enter lines 89 and 90, respectively, which in turn are connected to tubes 91 and 92 of preheat furnace 93. The reactants in a superheated condition are discharged from the preheat furnace by means of lines 95 and 96, and then these streams are combined in a single stream in line 97.

The reactants enter the top of hydroforming reactor 100 at a temperature of 975° F. and at a pressure of 520 p.s.i.g. The reactor contains about 95 cubic feet of catalyst, shown as figure 102, which weighs 4450 pounds. The catalyst contains 0.5% platinum supported on alumina. The conditions provide a weight space velocity of 1.9, and the reaction cycle is at least 3 minutes in duration. The average temperature in this reactor is 900° F. The reaction product from reactor 100 is at a temperature of 825° F., and it is discharged therefrom by means of line 104. The reaction product in line 104 divides so that equal portions pass through lines 105 and 106, prior to entering reheat furnace #1, through tubes 107 and 108, respectively. The reaction product is reheated to a temperature of 975° F., and then it is discharged from the reheat furnace #1 to lines 110 and 111, which combine as a single stream in a line 112. The reaction product enters a second reactor 114 which contains the same volume, weight and type of catalyst as in reactor 100. The catalyst in reactor 114 is shown as bed 115. The reaction product leaving reactor 100 is at a pressure of 515 p.s.i.g., whereas at the outlet of reactor 114 the pressure is 490 p.s.i.g. The product of reactor 114 exists at a temperature of 900° F., and it is passed through a line 117 leading therefrom. The product in line 117 is divided such that equal portions pass through lines 119 and 120, prior to entering tubes 122 and 123, respectively, of reheat furnace #2. The product is reheated to a temperature of 975° F., and thence it is discharged from reheat furnace #2 by means of lines 125 and 126. The split product streams are combined as a single stream in a line 128, following which, it enters a third reactor 130 containing a catalyst bed 131. The catalyst bed occupies 188 cubic feet and weighs 8800 pounds. The pressure at the exit of reactor 130 is 465 p.s.i.g., and the temperature is 950° F.

The reaction product in reactor 130 is discharged therefrom through a bottom line 133. In the event of regeneration, the flue gas is discharged from the system by means of a line 135. The reaction product in line 133 passes to a heat exchanger 31, and its temperature is reduced to 840° F. The cooled reaction product passes from exchanger 31 to a line 137, and thence to a second heat exchanger 139, wherein the temperature is reduced to 735° F. The reaction product passes from exchanger 139 to a line 141, and thence to another heat exchanger 79 wherein the temperature is reduced to 660° F. Following the third exchanger of heat, the reaction product passes to a condenser 144 by means of line 145. The normally liquid product material is condensed under essentially reaction pressure, and thence a mixture of liquid product and gas passes to an accumulator 147 by means of line 149.

In accumulator 147, a separation of liquid product from gaseous material is effected under a pressure of 435 p.s.i.g., and a temperature of 100° F. The gaseous product is discharged from accumulator 147 at the rate of 21,638 pounds per hour having a molecular weight of 11.0 by means of a line 150. This gas stream is split so that 3,511 pounds per hour pass through a line 24 and is earmarked for use in the desulfurization reaction, and the remainder passes through a line 153 at the rate of 18,127 pounds per hour. The latter stream is recycled to the hydroforming reactors, hence, it passes first to a separating drum 154 for the removal of entrained liquid, and thence it passes overhead therefrom through a line 156 for compression in compressor 157. Following compression, the recycle gas passes to line 76, after which it is combined with the desulfurized feed in line 78.

The liquid product in accumulator 147 is discharged from the bottom thereof by means of a line 160. This liquid product passes to a heat exchanger 162 wherein the temperature is raised from 100° F. to 255° F. The heated product passes from exchanger 162 to a line 164, and thence it divides into lines 165 and 166, prior to entering depropanizer column 168. The bottom of this column is at a temperature of 440° F. and a pressure of 245 p.s.i.g. The overhead product is discharged through a top line 170 at a temperature of 130° F. The overhead product consists essentially of $C_3$ and lighter hydrocarbon and a small amount of $C_4$ hydrocarbons are included. The overhead vapors in line 170 are condensed in condenser 172, and thence pass to an accumulator 174 by means of a line 176. Gaseous material under a temperature of 100° F. and a pressure of 230 p.s.i.g., passes overhead from accumulator 174 through a line 180, which leads to line 17, the gas feed line to absorption tower 7. This gas flows at the rate of 2,264 pounds per hour, and it has a molecular weight of 37.7. The liquid in accumulator 174 is withdrawn by means of line 182, and recycled to tower 168 by means of pump 184 and line 186. Heat is supplied to the bottom of tower 168 by withdrawing liquid from tray 188, passing it through line 190, exchanger 139, line 192 leading therefrom, and then back to the tower. The depropanized hydroformate is discharged from the bottom of tower 168, through a line 194, and thence it is cooled in heat exchanger 162 from a temperature of 440° F. to 295° F. The product passes from exchanger 162 to line 196, thence through cooler 198 wherein the temperature is lowered to 100° F. and discharged from the system by means of line 200 at the rate of 2,627 b.p.s.d having a gravity of 51.1° API.

Having thus furnished a description of this invention along with specific illustrations, it should be understood that no undue limitations or restrictions are to be imposed by reason thereof, but that the present invention is defined by the appended claims.

We claim:

1. A process for desulfurizing hydrocarbon oils containing sulfur which comprises contacting the liquid hydrocarbon feed with normally gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure in the presence of hydrogen, thereby producing a reaction product containing hydrogen sulfide, lowering the pressure and temperature of the reaction product and thus condensing a substantial portion of the normally liquid product materials and leaving a gaseous product containing a substantial portion of the hydrogen sulfide and also containing normally liquid product materials, and passing the gaseous product material to the absorption zone for contact with the liquid hydrocarbon feed to recover the normally liquid product materials therefrom.

2. A process for desulfurizing a light hydrocarbon oil containing sulfur which comprises contacting the said liquid hydrocarbon feed with gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure and in the presence of added hydrogen, thereby producing a reaction product containing hydrogen sulfide, lowering the pressure and temperature of the reaction product and thus condensing a substantial portion of the normally liquid product material and leaving a gaseous product containing a substantial portion of the hydrogen sulfide and also containing a portion of normally liquid product materials, passing the gaseous product material to the absorption zone for contact with the liquid hydrocarbon feed to remove therefrom the normally liquid product materials, contacting the desulfurized liquid product with a hydrogenation-dehydrogenation catalyst in a reforming zone under reforming conditions suitable for the production of a reformed product of improved octane quality and effecting a net production of hydrogen, separating a normally gaseous fraction including hydrogen from the normally liquid reformed product and utilizing the normally gaseous fraction as hydrogen for the desulfurization reaction.

3. A process for desulfurizing light hydrocarbon oils containing not more than 0.12% by weight of sulfur which comprises contacting the said hydrocarbon feed in the liquid state with normally gaseous hydrocarbons containing normally liquid hydrocarbons in an absorption zone to absorb the normally liquid hydrocarbons into the feed material, passing the enriched hydrocarbon feed to a desulfurization zone in contact with a hydrogenation catalyst at an elevated temperature and pressure and in the presence of added hydrogen, thereby producing a reaction product containing hydrogen sulfide, lowering the pressure and temperature of the reaction product and thus condensing a substantial portion of the normally liquid product containing not more than about 0.03% sulfur and leaving a gaseous product containing a substantial portion of the hydrogen sulfide and also containing normally liquid product material, and passing the gaseous product material to the absorption zone for contact with the liquid hydrocarbon feed to recover the normally liquid product materials therefrom.

4. A process for desulfurizing light hydrocarbon oils containing not more than 0.12% of sulfur which comprises contacting the said hydrocarbon feed in a liquid state with a gaseous hydrocarbon material containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure and in the presence of added hydrogen, thereby producing a reaction product containing hydrogen sulfide, lowering the pressure and temperature of the reaction product and thus condensing a substantial portion of the normally liquid product material containing not more than about 0.03% by weight of sulfur and leaving a gaseous product containing a substantial portion of the hydrogen sulfide and also containing normally liquid product material, passing a gaseous product material to the absorption zone for contact with the liquid hydrocarbon feed to recover the normally liquid product therefrom, contacting the desulfurized liquid product in a hydroforming zone with a noble metal and in the presence of added hydrogen thus producing a reaction product containing a normally liquid material of high anti-knock quality and normally gaseous hydrocarbons including hydrogen, separating the normally gaseous product material containing hydrogen from the reformed liquid product, recycling a portion of the hydrogen containing gas to the reforming zone and utilizing the other portion of the hydrogen containing gas as the sole supply of hydrogen to the desulfurization zone.

5. The process of claim 1 wherein the desulfurization catalyst is a compound of a left-hand element of group VI of the periodic table.

6. The process of claim 1 wherein the desulfurization catalyst comprises a compound of a left-hand element of group VI of the periodic table in combination with a compound of a metal of group VIII of the periodic table having an atomic number not greater than 28.

7. A process for desulfurizing light hydrocarbon oils containing sulfur which comprises contacting the light hydrocarbon oil in the liquid state with normally gaseous hydrocarbons containing normally liquid hydrocarbon components in an absorption zone thereby absorbing the normally liquid hydrocarbon components into the feed material, passing the enriched hydrocarbon feed to a desulfurization zone in contact with a catalyst selected from the group consisting of an oxide and a sulfide of a left-hand element of group VI of the periodic table at an elevated temperature and pressure and in the presence of added hydrogen, thereby producing a reaction product containing hydrogen sulfide, lowering the pressure and temperature of the reaction product and thus condensing a substantial portion of the normally liquid product material and leaving a gaseous product material containing a substantial portion of the hydrogen sulfide and also containing normally liquid product material and passing the gaseous product material to the absorption zone for contact with a liquid hydrocarbon feed to recover the normally liquid product material therefrom.

8. The process of claim 7 wherein the catalyst is further characterized by the additional presence of a second component selected from the group consisting of a sulfide and an oxide of a group VIII metal having an atomic number not greater than 28.

9. A process for desulfurizing light hydrocarbon oils containing sulfur compounds which comprises contacting a light hydrocarbon oil in a liquid state with normally gaseous hydrocarbons containing normally liquid hydrocarbon components in an absorption zone thereby absorbing the normally liquid hydrocarbons into the feed material, passing the enriched hydrocarbon feed to a desulfurization zone in contact with a catalyst selected from the group consisting of an oxide and a sulfide of a left-hand element of group VI of the periodic table at an elevated temperature and pressure and in the presence of hydrogen, thereby producing a reaction product containing hydrogen sulfide, lowering the pressure and temperature of the reaction product and thus condensing a substantial portion of the normally liquid product material having up to about 75% of its original sulfur concentration removed and leaving a gaseous product containing a substantial portion of the hydrogen sulfide and also containing normally liquid product material, passing the gaseous product material to the absorption zone for contact with a liquid hydrocarbon feed to recover the normally liquid product materials therefrom, contacting the desulfurized liquid product with a catalyst comprising a noble metal in a hydroforming zone under suitable reforming conditions thus producing a reaction product containing a normally liquid reformed product of high anti-knock quality, normally gaseous hydrocarbons and hydrogen, separating the normally gaseous fraction containing hydrogen from the reformed liquid product material, recycling a portion of the hydrogen containing gas to the hydroforming zone, and passing the remaining portion of hydrogen containing gas to the desulfurization zone as a once through operation.

10. The process of claim 9 wherein the catalyst comprises platinum supported on alumina.

11. A process for desulfurizing a naphtha fraction containing .05 to .12% by weight of sulfur which comprises contacting the naphtha in a liquid state with a gaseous hydrocarbon material containing normally liquid hydrocarbons in an absorption zone thereby absorbing the normally liquid hydrocarbons into the feed material, passing the enriched naphtha to a desulfurization zone in contact with a hydrogenation catalyst, at a temperature of about 700° to about 825° F., a total pressure of about 250 to about 800 p.s.i.g., a weight space velocity of about 2.5 to about 15, in the presence of added hydrogen in the amount of about 500 to about 1800 s.c.f.b., thereby producing a reaction product containing hydrogen sulfide, lowering the pressure and temperature of the reaction product and thus condensing substantially all of the normally liquid product material in a desulfurized state containing not more than about 0.03% by weight of sulfur and leaving a gaseous product material containing hydrogen sulfide and normally liquid product material therein, passing the gaseous product material to the absorption zone for contact with the liquid naphtha feed to recover the normally liquid product material therefrom, passing the desulfurized liquid product to a hydroforming zone in contact with a catalyst comprising platinum supported on alumina, at a temperature of about 800° to about 950° F., a pressure of about 100 to about 750 p.s.i.g., a weight space velocity of about 0.5 to about 7, in the presence of added hydrogen in the amount of about 1000 to about 7500 s.c.f.b., thus producing a reaction product containing normally liquid material of high anti-knock quality, normally gaseous hydrocarbons and hydrogen which is produced at the rate of about 500 to about 1800 s.c.f.b., reducing the temperature of the reaction product and thus forming a reformed liquid product containing normally gaseous hydrocarbons and leaving a gaseous product containing hydrogen, passing the reformed liquid product to a separation zone wherein substantially all of the normally gaseous hydrocarbons are removed therefrom, passing the normally gaseous hydrocarbons to the absorption zone, recycling a portion of the hydrogen containing gas to the hydroforming zone, and supplying the remaining portion of the hydrogen containing gas to the desulfurization zone at a rate such that the hydrogen is furnished in the amount of about 500 to about 1800 s.c.f.b.

12. A process for desulfurizing a light hydrocarbon oil containing sulfur which comprises contacting the liquid hydrocarbon feed with normally gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure in the presence of hydrogen, thereby producing a reaction product containing hydrogen sulfide, lowering the temperature of the reaction product and thus condensing a substantial portion of the normally liquid product materials and leaving a gaseous product containing a substantial portion of the hydrogen sulfide and also containing normally liquid product materials, and passing the gaseous product material to the absorption zone for contact with the liquid hydrocarbon feed to recover the normally liquid product materials therefrom.

13. A process for desulfurizing hydrocarbon oils containing sulfur which comprises contacting the liquid hydrocarbon feed with normally gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation at a temperature of about 700 to about 825° F. and a pressure of about 250 to about 800 p.s.i.g. in the presence of hydrogen, thereby producing a reaction product containing hydrogen sulfide, lowering the pressure of the reaction product to between about 60 and about 150 p.s.i.g. and lowering the temperature of the reaction product to between about 60 and about 140° F., thus condensing a substantial portion of the normally liquid product materials and leaving a gaseous product containing a substantial portion of the hydrogen sulfide and also containing normally liquid product materials, and passing the gaseous product material to the absorption zone for contact with the liquid hydrocarbon feed to recover the normally liquid product materials therefrom.

14. A process for desulfurizing hydrocarbon oils containing sulfur which comprises contacting the liquid hydrocarbon feed with normally gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure in the presence of hydrogen, thereby producing a reaction product containing hydrogen sulfide, lowering the pressure and temperature of the reaction product and thus condensing a substantial portion of the normally liquid product materials and leaving a gaseous product material containing about 75 to about 85% of the hydrogen sulfide and also containing normally liquid product materials, and passing the gaseous product material to the absorption zone for contact with the liquid hydrocarbon feed to recover the normally liquid product materials therefrom.

15. A process for desulfurizing hydrocarbon oils containing sulfur which comprises contacting liquid hydrocarbon feed with normally gaseous hydrocarbons containing normally liquid hydrocarbons in an absorption zone thereby absorbing the normally liquid hydrocarbons into the feed material, passing the enriched hydrocarbon feed to a desulfurization zone in contact with a hydrogenation catalyst at an elevated temperature and pressure in the presence of hydrogen thereby producing a reaction product containing hydrogen sulfide, normally gaseous and normally liquid hydrocarbons, lowering the pressure and temperature of the reaction product thus condensing a substantial portion of the normally liquid product materials and leaving a gaseous product containing a majority of said hydrogen sulfide and also containing normally liquid hydrocarbons and passing said gaseous product to said absorption zone for contact with the liquid hydrocarbon feed to recover the normally liquid hydrocarbons therefrom whereby the normally liquid hydrocarbon products recovered from the gaseous product are returned to the desulfurization zone with the feed thereto.

References Cited in the file of this patent

UNITED STATES PATENTS

| | | |
|---|---|---|
| 2,414,883 | Martin | Jan. 28, 1947 |
| 2,580,478 | Stine | July 1, 1952 |
| 2,642,381 | Dickinson | June 16, 1953 |
| 2,758,068 | Howard | Aug. 7, 1956 |

UNITED STATES PATENT OFFICE
CERTIFICATE OF CORRECTION

Patent No. 2,890,165                                        June 9, 1959

Charles Bednars et al.

It is hereby certified that error appears in the above numbered patent requiring correction and that the said Letters Patent should read as corrected below.

Column 4, line 10, after "including" insert -- the --; column 7, line 15, for "heheated" read -- reheated --; column 11, line 44, after "generation" insert -- catalyst --.

Signed and sealed this 13th day of October 1959.

(SEAL)

Attest:

KARL H. AXLINE                                              ROBERT C. WATSON

Attesting Officer                                      Commissioner of Patents